May 15, 1945.                R. G. LE TOURNEAU                2,375,799
                                FOLDING CRANE
                             Filed Nov. 2, 1943           2 Sheets-Sheet 1
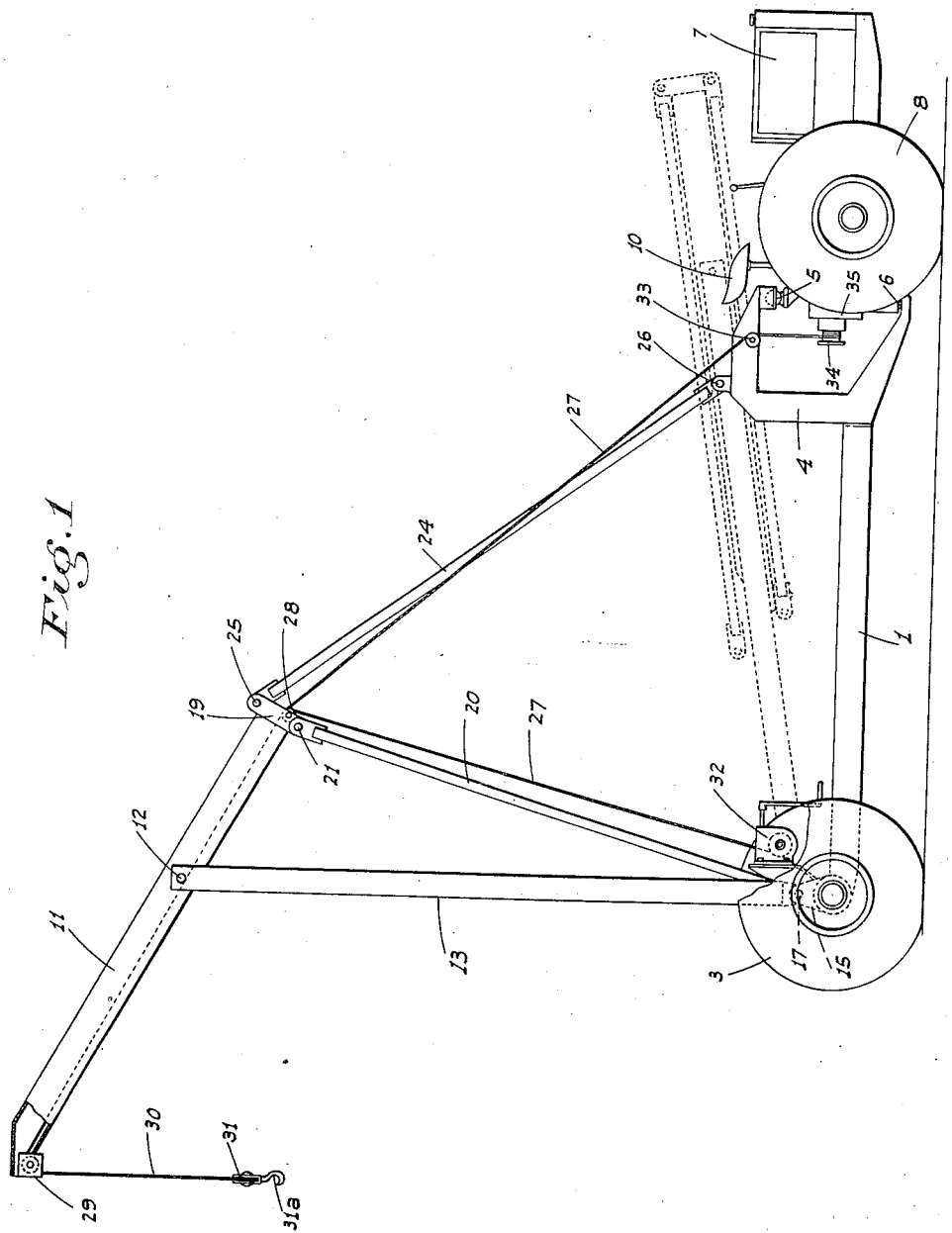
INVENTOR
R. G. LeTourneau
BY
ATTYS May 15, 1945.   R. G. LE TOURNEAU   2,375,799
FOLDING CRANE
Filed Nov. 2, 1943   2 Sheets-Sheet 2
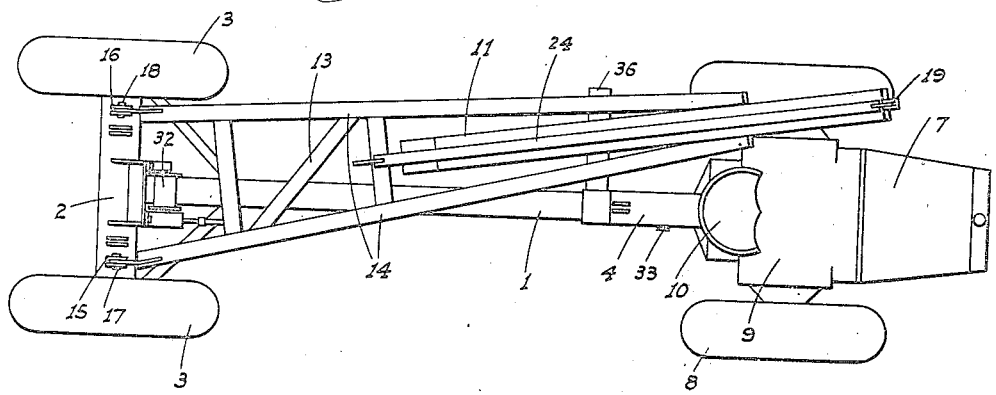
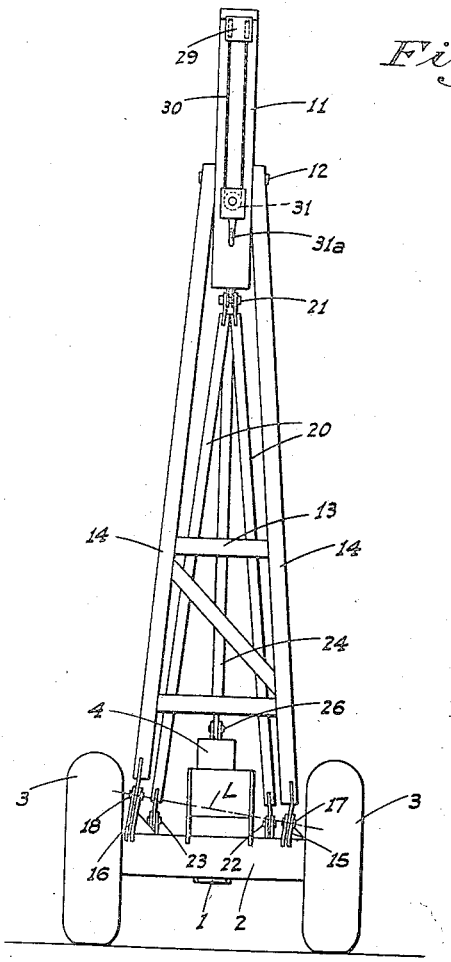
INVENTOR
R.G. LeTourneau
BY
ATTYS Patented May 15, 1945

2,375,799

UNITED STATES PATENT OFFICE 2,375,799

FOLDING CRANE

Robert G. Le Tourneau, Peoria, Ill., assignor to R. G. Le Tourneau, Inc., Stockton, Calif., a corporation of California Application November 2, 1943, Serial No. 508,689

10 Claims. (Cl. 212—8)

This invention relates to, and it is an object to provide in a portable self-propelled crane which includes a tractor having an operator's seat thereon and a forwardly folding boom assembly of a length when folded to project ahead of said seat, a mounting arrangement for said boom assembly wherein when the latter is folded forwardly and downwardly, it angles in forwardly diverging relation to the longitudinal axis of the implement so as to miss the operator's seat and extend to one side thereof.

A further object of this invention is to provide a folding crane, as in the preceding paragraph, in which the boom assembly includes a normally upstanding post unit having transversely spaced posts mounted in connection with a rear axle housing and on transversely extending pivots for forward and downward folding movement; said transverse pivots being disposed at different vertical distances above said axle housing and the pivots being in axial alinement.

It is also an object of this invention to provide a portable folding crane which includes a boom assembly of novel construction.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the implement showing the crane assembly in normally erected position in full lines, and in folded position in dotted lines.

Figure 2 is a plan view of the implement with the boom assembled in folded position.

Figure 3 is a rear end view of the implement with the boom assembly erected.

Referring now more particularly to the characters of reference on the drawings, the folding crane comprises a rigid, elongated draft beam 1 disposed horizontally above the ground. A horizontally disposed transverse axle housing 2 is fixed in connection with the rear end of draft beam 1 and projects laterally beyond opposite sides thereof. At the outer ends of axle housing 2 said housing is supported by wheels 3.

At its forward end the draft beam 1 is formed with a rigid, upstanding, forwardly opening draft yoke 4 which is coupled by means shown in part at 5 and 6 with the rear end of a tractor, indicated generally at 7. This tractor is here shown as a two-wheel type tractor which includes transversely spaced drive and steering wheels 8, and an intermediate transmission housing 9 on which is mounted an upstanding operator's seat 10. The coupling means 5 and 6 connect the tractor 7 with the yoke 4 in vertically inflexible but horizontally steerable relation.

The boom assembly comprises a rearwardly and upwardly inclined boom 11 pivotally connected, as at 12, to and supported intermediate its ends by a post unit, indicated at 13, and which post unit comprises, in rigid unitary relation, a pair of relatively tall upwardly converging posts 14.

At their lower ends the posts 14 are pivotally mounted in connection with the axle housing 2 for forward and downward folding movement, such pivotal mounting comprising pivotally connected ear and clevis units 15 and 16; the transverse pivots 17 and 18 of the units 15 and 16, respectively, being disposed different distances from the axle housing 2 but in axial alinement with each other. In other words, the axis of forward swinging movement of the post unit 13, as illustrated by the broken line L, is at a slope relative to horizontal in a transverse vertical plane.

The forward and lower end of the boom 11 terminates at a point ahead of the post unit 13 but at a considerable height above the draft beam 1. At such forward end, the boom 11 is formed with a cross head 19 whose ends project beyond the top and bottom of said boom. A pair of stabilizing legs 20 are pivotally connected to the normally lower end of said cross head 19 as at 21, and thence extend downwardly in divergent relation to detachable pivotal connection, as at 22 and 23, on the axle housing 2 at transversely spaced points on opposite sides of the draft beam 1.

A tension rod or brace 24 is pivotally connected at its upper end, as at 25, with the upper end of the cross head 19 and thence extends at a downward and forward slope to detachable connection, as at 26, with the yoke 4 at the top of the latter.

The above described boom assembly is normally erected as shown in Figs. 1 and 2, and when so erected is vertical transversely of the implement.

A lift cable 27 extends through the boom, which is hollow, from end to end thereof as transversely spaced reaches, which pass about direction-changing sheaves 28 at the lower end of the boom and about a head block 29 at the upper end of the boom. The depending reaches 30 of the lift cable 27 pass about a pulley 31 from which a lift hook 31a or the like depends. One reach of the lift cable 27 below the direction-changing sheave 28 is connected to a hand actuated winch 32 mounted on the axle housing 2, while the other reach extends forwardly and over a direction-changing sheave 33 on the yoke 4 and is thence connected to the cable drum 34 of a conventional power winch 35 mounted on and projecting from the rear of the tractor within said yoke. Either the power winch 35 or the hand winch 32 may thus be used to lift a load; the winch 32 being used for accurate positioning of the load after it has been approximately positioned by the power winch. When either winch is used, the other winch becomes the anchor for the corresponding end of the lift cable.

For transport from place to place, the boom assembly is lowered as follows:

The legs 26, together with the brace 24, are detached at their lower ends and said legs and brace, together with the boom 11 and post unit 13, are folded into compact relationship against each other, and to the down position, as shown in dotted lines in Fig. 1. By virtue of the hereinbefore described arrangement of the pivots 17 and 18 at the lower end of the posts 14 the boom assembly, when folded and in down position, extends in a horizontal and diverging relation to the draft beam 1 and to the side of the yoke 4 and operator's seat 10. In this down position the boom assembly is supported by suitable means, such as a rigid arm or stop 36 which projects laterally from the corresponding side of the yoke, and the folded boom assembly does not then interfere with an operator sitting on the seat 10.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A portable crane comprising an elongated wheel supported frame, a tractor connected in draft relation with said frame, a normally upstanding foldable boom assembly, and means mounting said boom assembly adjacent its lower end on the frame adjacent the rear end of the latter for swinging movement to a forward and downward folded position; the boom assembly when so positioned diverging forwardly relative to the frame.

2. A portable crane comprising an elongated wheel-supported frame, a tractor connected in draft and steerable relation to the frame, the tractor having an operator's seat thereon, a normally erected but foldable boom assembly, and means mounting said boom assembly on the frame for pivotal swinging movement about an axis adjacent the rear end of the frame to a forward and downward folded position; said boom assembly when erected being vertical transversely of the frame, and the axis of said pivotal movement being at a transverse slope whereby when in said folded position the boom assembly diverges forwardly relative to the frame and extends to one side of the operator's seat.

3. A portable crane comprising an elongated wheel-supported frame, a tractor connected in draft and steerable relation to the frame, the tractor having an operator's seat thereon, a normally erected but foldable boom assembly, and means mounting said boom assembly on the frame for pivotal swinging movement about an axis adjacent the rear end of the frame to a forward and downward folded position; said boom assembly when erected being vertical transversely of the frame, and said mounting means comprising a pair of pivotal connections disposed in transversely spaced axial alinement, one of said pivotal connections being disposed a greater distance above the frame than the other one of said pivotal connections whereby when in said folded position the boom assembly diverges forwardly relative to the frame and extends to one side of the operator's seat.

4. A portable crane comprising an elongated wheel-supported frame, a tractor connected in draft and steerable relation to the frame, the tractor having an operator's seat thereon, a normally erected but foldable boom assembly, the frame including a horizontal, transversely extending rear axle housing, the boom assembly including a pair of transversely spaced supporting posts, and means mounting the boom assembly on the frame for pivotal swinging movement to a forward and downward folded position, said means including pivotal connections between the lower ends of said posts and the axle housing, said pivotal connections being transversely spaced and alined but disposed at different distances above said housing whereby when in said folded position the boom assembly diverges forwardly relative to the frame and extends to one side of the operator's seat.

5. A boom assembly for a portable crane which includes an elongated frame, a rigid post unit mounted on and upstanding from the frame adjacent one end thereof, a longitudinally extending boom secured intermediate its ends in connection with the upper end of the post unit, the inner end of the boom terminating a substantial height above the frame, a pair of transversely spaced legs connected to the inner end portion of the boom and thence depending in diverging relation to connection with the frame adjacent the lower end of the post unit, and a brace connected with said inner end of the boom and extending therefrom at a forward and downward slope, the lower end of the brace being secured to the frame adjacent the other end thereof.

6. A boom assembly as in claim 5 in which the post unit at its lower end is pivotally connected with the frame for forward swinging movement to a down position; said legs and brace being pivoted at their upper ends to the boom and detachable at their lower ends from the frame.

7. A boom assembly for a portable crane which includes an elongated frame, a rigid post unit mounted on and upstanding from the frame adjacent one end thereof, said post unit including a pair of rigid, downwardly diverging posts pivoted on a transverse axis at their lower ends in connection with the frame, a boom pivotally secured intermediate its ends on the upper end of the post unit, the inner end of the boom terminating a substantial height above the frame, a pair of transversely spaced legs pivoted on a transverse axis to the inner end of the boom and thence depending in diverging relation to detachable connection with the frame adjacent the lower ends of corresponding posts, and a brace pivoted on a transverse axis to said inner end of the boom and extending at a forward and downward slope to detachable connection with the frame adjacent its other end.

8. In a crane having a boom, a load supporting unit including a lift cable arranged on the boom as a pair of spaced reaches having portions depending from the boom, a pulley about which the depending portions of the cable reaches pass, a power winch on the crane to which one of said depending portions of the cable is attached, and a hand winch on the crane to which the other depending portion of the cable is attached.

9. In a crane having a boom, a load supporting unit including a lift cable arranged on the boom as a pair of spaced reaches having portions depending from the boom, a pulley about which the depending portions of the cable reaches pass, and separately operable winches to which said depending portions of the cable are separately attached.

10. A boom assembly for a portable crane which includes an elongated frame, a rigid post unit mounted on and upstanding from the frame, a longitudinally extending boom secured intermediate its ends in connection with the upper end of the post unit, the inner end of the boom terminating a substantial height above the frame, a leg unit connected to the inner end portion of the boom and thence depending to connection with the frame, and a brace connected with said inner end of the boom and extending therefrom at a forward and downward slope to connection with the frame; the post and brace being connected to said frame at relatively widely spaced points lengthwise of the crane.

ROBERT G. LE TOURNEAU.